United States Patent
Okumura (10) Patent No.: US 10,849,105 B2
(45) Date of Patent: Nov. 24, 2020

(54) WIRELESS COMMUNICATION DEVICE AND PROGRAM FOR CONTROLLING COMMUNICATION MODE OF THE SAME

(71) Applicant: RENESAS ELECTRONICS CORPORATION, Tokyo (JP)

(72) Inventor: Akihito Okumura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/962,983

(22) Filed: Apr. 25, 2018

(65) Prior Publication Data
US 2018/0359729 A1 Dec. 13, 2018

(30) Foreign Application Priority Data
Jun. 12, 2017 (JP) ................. 2017-115180

(51) Int. Cl.
*H04W 72/04* (2009.01)
*H04B 17/318* (2015.01)
*H04B 1/00* (2006.01)
*H04L 1/00* (2006.01)

(52) U.S. Cl.
CPC .......... *H04W 72/04* (2013.01); *H04B 17/318* (2015.01); *H04L 1/0009* (2013.01); *H04L 1/00* (2013.01)

(58) Field of Classification Search
CPC ..... H04W 72/04; H04W 72/06; H04W 72/08; H04W 72/048; H04B 17/318; H04L 1/0009
See application file for complete search history.

(56) References Cited

U.S. PATENT DOCUMENTS

2006/0294573 A1* 12/2006 Rogers ............... H04N 7/17309
725/147
2009/0253379 A1* 10/2009 Trachewsky ............ H04W 8/30
455/68

(Continued)

OTHER PUBLICATIONS

Bluetooth Core Specification v5.0, retrieved on line on May 24, 2017 from: https://www.bluetooth.org/DocMan/handlers/DownloadDoc.ashx?doc_id=421043.

*Primary Examiner* — Brian P Cox
(74) *Attorney, Agent, or Firm* — McDermott Will & Emery LLP (57) ABSTRACT

In the field of wireless communication, a technique for inhibiting a disconnection while also inhibiting a communication slow-down is provided. A wireless communication device includes: a communication module configured to be capable of communicating with another wireless communication device through plural channels in a first mode with a first code strength and in a second mode with a second code strength higher than the first code strength; a strength measurement unit which measures a received signal strength; a channel detection unit which detects unused channels; and a control device which switches the communication mode of the communication module between the first mode and the second mode based on the strength measured by the strength measurement unit of a signal received from another wireless communication device and the number of unused channels detected out of plural channels by the channel detection unit.

7 Claims, 7 Drawing Sheets

(56) References Cited

U.S. PATENT DOCUMENTS

| | | | |
|---|---|---|---|
| 2012/0120998 A1* | 5/2012 | Fakhrai | H04B 7/0413 |
| | | | 375/224 |
| 2013/0145236 A1* | 6/2013 | Baker | H03M 13/116 |
| | | | 714/776 |
| 2018/0176841 A1* | 6/2018 | Sankaranarayan | H04W 36/14 |
| 2018/0234494 A1* | 8/2018 | Klemets | H04L 69/14 |
| 2019/0089556 A1* | 3/2019 | Bohge | H04L 12/433 |

* cited by examiner

WIRELESS COMMUNICATION DEVICE AND PROGRAM FOR CONTROLLING COMMUNICATION MODE OF THE SAME

CROSS-REFERENCE TO RELATED APPLICATIONS

The disclosure of Japanese Patent Application No. 2017-115180 filed on Jun. 12, 2017 including the specification, drawings and abstract is incorporated herein by reference in its entirety.

BACKGROUND

This disclosure relates to a wireless communication device and, more particularly, to a technique for switching the communication mode of the wireless communication device.

In recent years, along with the promotion of IoT (Internet of Things), various communications have been made wireless. Also, Bluetooth (registered trademark) 5.0 was disclosed last year as a communication standard for IoT (Bluetooth Core Specification v5.0, retrieved on line on May 24, 2017 from: https://www.bluetooth.org/DocMan/handlers/DownloadDoc.ashx?doc_id=421043.

Bluetooth 5.0 has a new communication mode allowing a transmission distance longer than possible with related-art communication modes. To be more specific, the new communication mode realizes a long transmission distance by means of a code strength higher than those of related-art communication modes.

SUMMARY

Wireless communication is a technique for making communication using radio waves. Hence, there are cases in which wireless communication is disconnected, for example, because of interference by other radio waves and signal strength attenuation with distance.

To address the above problem, conducting communication using signals with a high code strength may be considered. Signals with a high code strength are, however, low in code rate. Therefore, conducting communication using signals with a high code strength causes a different problem of a low communication speed.

The present disclosure is aimed at solving the above problem and provides a technique for inhibiting communication disconnection while also inhibiting a communication slow-down.

A wireless communication device according to an embodiment includes: a communication module configured to be capable of communicating with another wireless communication device through plural channels in a first mode with a first code strength and in a second mode with a second code strength higher than the first code strength; a strength measurement unit which measures a strength of a signal received from another wireless communication device; a channel detection unit which detects, out of plural channels, unused channels based on a signal strength of each channel; and a control device which switches the communication mode of the communication module between the first mode and the second mode based on the strength measured by the strength measurement unit of a signal received from another wireless communication device and the number of unused channels detected out of plural channels by the channel detection unit.

The wireless communication device according to an embodiment of the present invention can inhibit communication disconnection while also inhibiting a communication slow-down.

Other objects and novel features of the present invention will become apparent from the following description of this specification and accompanying drawings.

DETAILED DESCRIPTION

In the following, embodiments of the above technical idea will be described in detail with reference to drawings. In the following description, identical parts are denoted by identical reference numerals and symbols. Such identical parts have identical names and functions and, for such identical parts, detailed descriptions will not be repeated. The embodiments and modification examples being described in the following may be selectively combined as appropriate.

[Related Technology]

Figure 1:
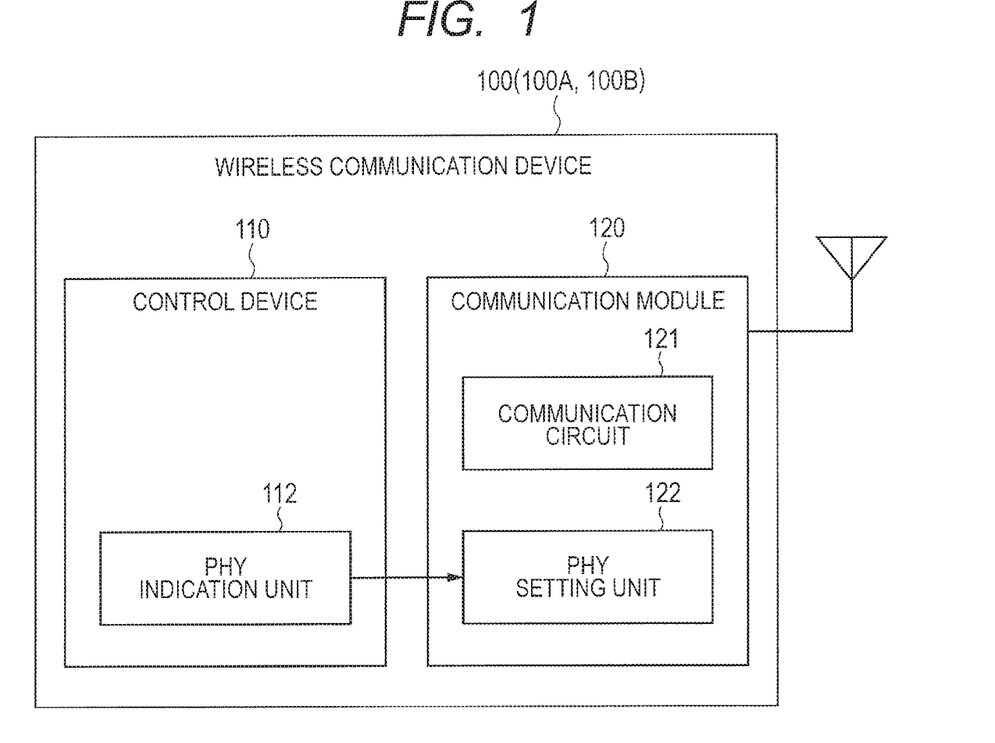
FIG. 1 is a diagram for describing the configuration of a wireless communication device based on related technology.

First, with reference to FIGS. 1 to 3, the problem with a wireless communication device 100 based on related technology will be described. FIG. 1 is a diagram for describing the configuration of the wireless communication device 100 based on related technology. The wireless communication device 100 includes a control device 110 and a communication module 120.

The control device 110 includes a PHY (physical layer) indication unit 112 as a functional unit. The communication module 120 includes a communication circuit 121 and a PHY setting unit 122.

The communication module 120 is configured to be capable of communication in compliance with the Bluetooth 5.0 standard. Features of the Bluetooth 5.0 standard will be described below with reference to FIG. 2.

Figure 2:
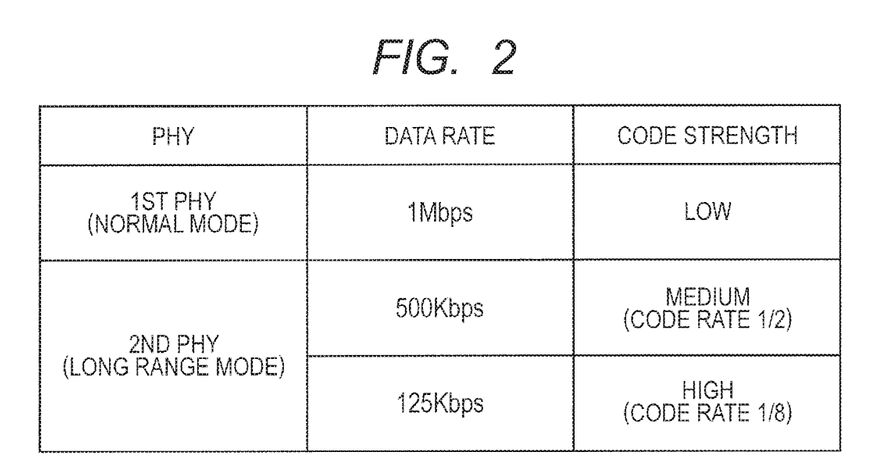
FIG. 2 is a table for describing features of each PHY of BLE (Bluetooth Low Energy) according to Bluetooth 5.0.

FIG. 2 is a table for describing features of each PHY of BLE (Bluetooth Low Energy) according to Bluetooth 5.0.

As shown in FIG. 2, Bluetooth 5.0 has a first PHY (physical layer) which does not perform forward error correction and a second PHY which performs forward error correction. For the following description, the communication mode complying with the first PHY is defined as a normal mode and the communication modes complying with the second PHY are defined as long-range modes.

The long-range modes includes a communication mode with a code rate of ½ (hereinafter also referred to as a "first long-range mode") and a communication mode with a code rate of ⅛ (hereinafter also referred to as a "second long-range mode").

Signals used in the normal mode do not include forward correction codes and are, therefore, low in code strength. Signals used in the long-range modes include forward error correction codes and are, therefore, higher in code strength than signals used in the normal mode. Hence, the long-range modes have longer maximum communication distances than the normal mode. Signals used in the second long-range mode are higher in code strength than signals used in the first long-range mode.

The data rate is 1 Mbps (bits per second) in the normal mode, 500 Kbps in the first long-range mode, and 125 Kbps in the second long-range mode. Note that Bluetooth 5.0 also includes a PHY with a data rate of 2 Mbps.

Referring to FIG. 1, again, the communication module 120 communicates with another device in one of the above-described communication modes.

The PHY (physical layer) indication unit 112 specifies one of the above-described communication modes, for example, based on an input from a user interface (e.g. a button), not shown, or a setting stored in a memory, not shown. The PHY indication unit 112 outputs the specified information to the PHY setting unit 122.

Based on the information inputted from the PHY indication unit 112, the PHY setting unit 122 sets a communication mode for use in communicating with another device. The communication circuit 121 communicates with another device in the communication mode that has been set.

In the above case, the communication module 120 communicates with another device with which communication has been established basically using a communication mode. The problem with the above wireless communication device will be described with reference to FIG. 3.

Figure 3:
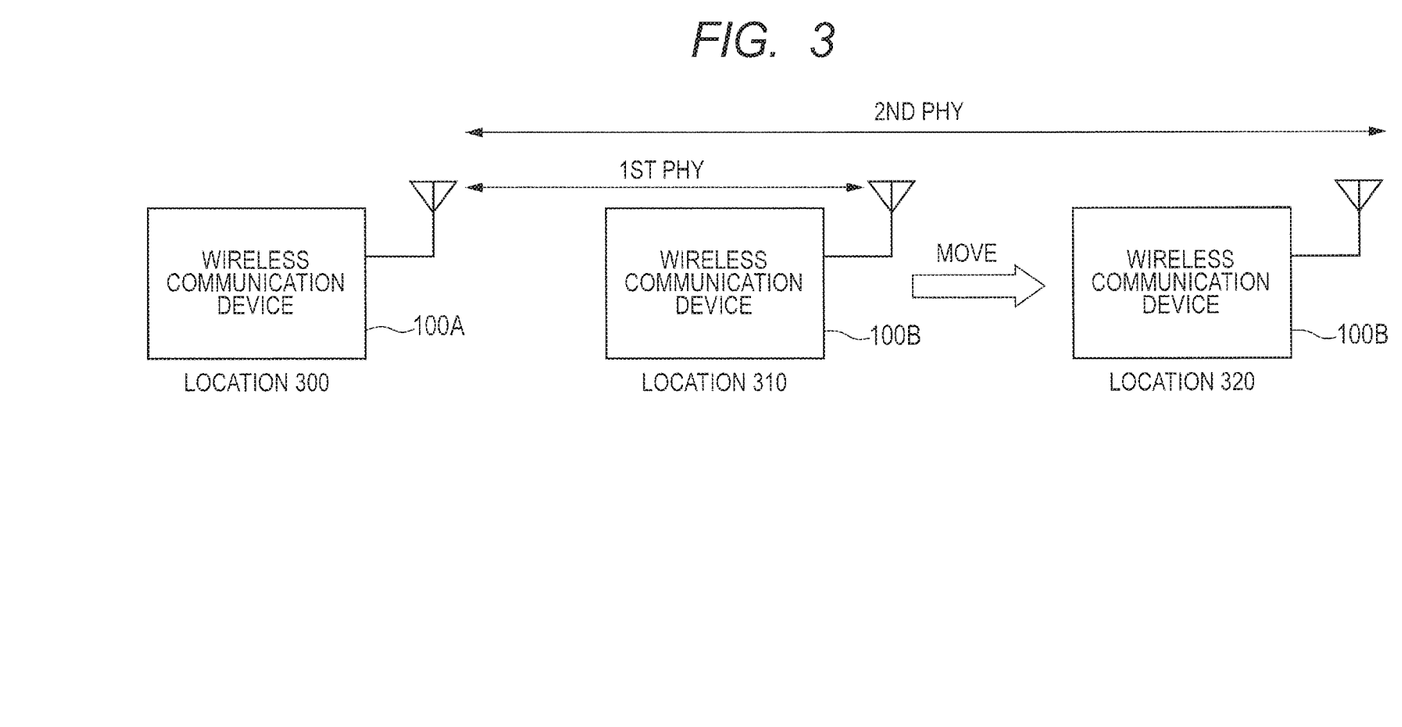
FIG. 3 is a diagram for describing communications between wireless communication devices 100A and 100B.

FIG. 3 is a diagram for describing communications between wireless communication devices 100A and 100B. The wireless communication devices 100A and 100B are each configured identically to the wireless communication device 100 described above.

Referring to FIG. 3, assume that the wireless communication device 100A at location 300 is communicating with the wireless communication device 100B at location 310 in the normal mode (the first PHY) and that the wireless communication device 100B moves from location 310 to location 320.

The distance between locations 300 and 320 is longer than the maximum communication distance (theoretically 100 m) in the normal mode. Therefore, the wireless communication device 100A and the wireless communication device 100B at location 320 are required to communicate with each other in a long-range mode.

However, the wireless communication devices 100A and 100B based on related technology are not configured to be capable of automatically switching the communication mode. Therefore, the wireless communication device 100A cannot communicate with the wireless communication device 100B at location 320.

Assume a different situation in which the wireless communication devices 100A and 100B are communicating with each other in a long-range mode. In this case, the wireless communication device 100A can maintain the communication connection with the wireless communication device 100B even if the wireless communication device 100B moves from location 310 to location 320.

In the above situation, however, the wireless communication device 100A has to communicate with the wireless communication device 100B in the long-range mode in which the communication speed is lower than in the normal mode even when the wireless communication device 100B is located in a normal-mode communication range.

Bluetooth shares the 2.4 GHz band (ISM band: Industry Science Medical Band) with the wireless LAN (Local Area Network). Hence, communications between the wireless communication devices 100A and 100B can be interfered with by other radio waves. Therefore, when the interference by other radio waves is strong, the wireless communication devices 100A and 100B are required to communicate with each other in a long-range mode even if the distance between the wireless communication devices 100A and 100B is in a range allowable for communications in the normal mode.

However, the wireless communication devices 100A and 100B based on related technology are not configured to be capable of automatic communication-mode switching. Hence, even when the interference by other radio waves is strong, the wireless communication devices 100A and 100B continue communicating with each other in the normal mode. As a result, the wireless communication devices 100A and 100B frequently fail in communication.

To solve the above problem, the wireless communication device according to the following embodiment of the present invention is configured to be capable of automatically switching the communication mode. To be more specific, when it is determined that communication with another device in the normal mode is possible, the wireless communication device communicates in the normal mode and, when it is determined that communication in the normal mode is not possible, the wireless communication device switches the communication mode to a long-range mode. In this way, the wireless communication device according to the following embodiment can inhibit a communication disconnection while also inhibiting a communication slowdown. The specific configuration of and control performed by the wireless communication device will be described in the following.

Embodiment (Configuration of Wireless Communication Device)

Figure 4:
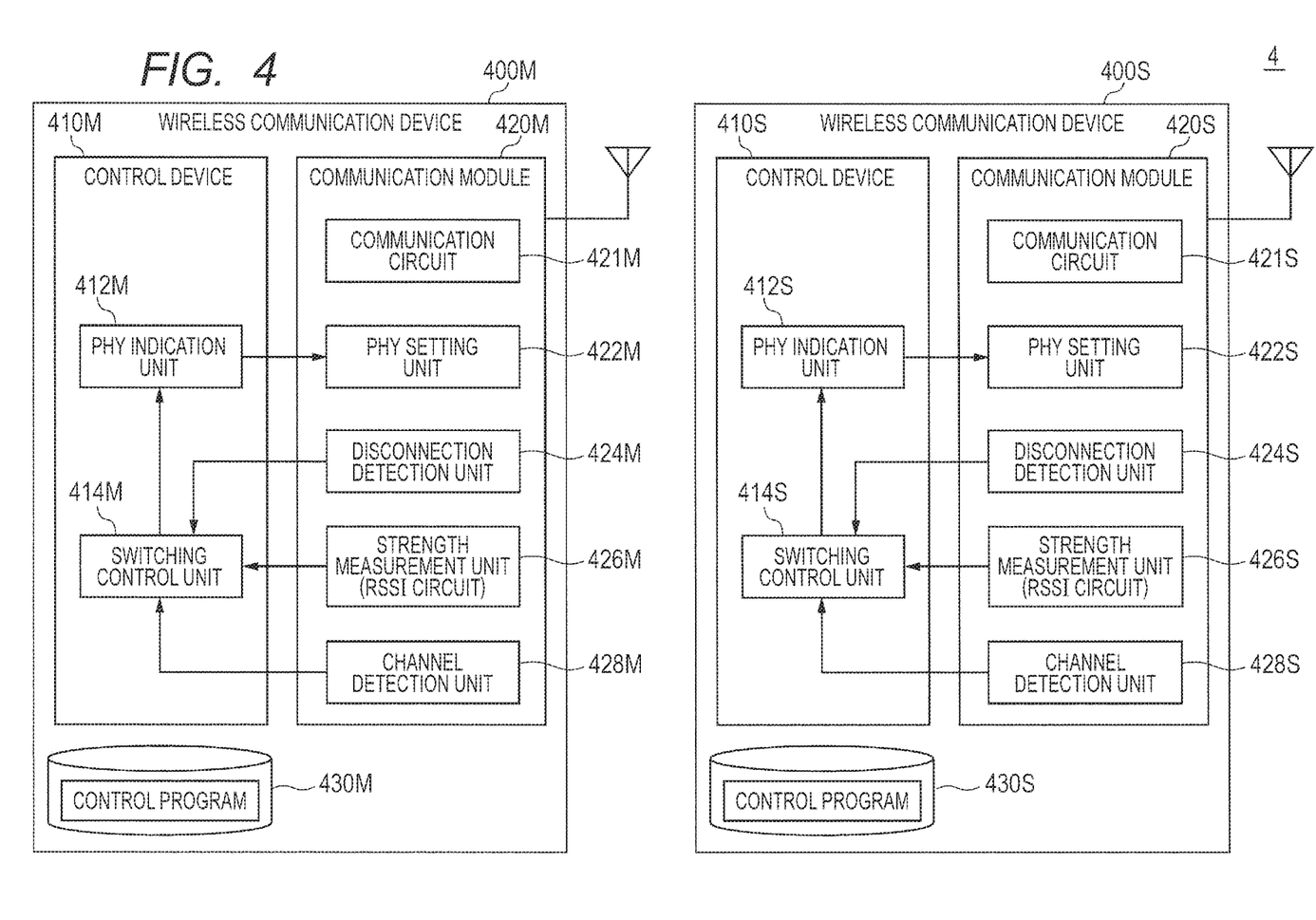
FIG. 4 is a block diagram showing the configuration of a wireless communication system according to an embodiment of the present invention.

FIG. 4 is a block diagram showing the configuration of a wireless communication system 4 according to an embodiment of the present invention. The wireless communication system 4 includes a wireless communication device 400M and a wireless communication device 400S. The wireless communication devices 400M and 400S communicate with each other. The wireless communication devices 400M and 400S are identically configured, so that, in the following, the configuration of the wireless communication device 400M will be representatively described.

The wireless communication device 400M includes a control unit 410M, a communication module 420M, and a storage unit 430M. The communication module 420M is configured to be capable of communication based on the Bluetooth 5.0 standard.

The control device 410M functions as a PHY indication unit 412M and a switching control unit 414M by reading and executing a control program stored in the storage device 430M.

The PHY indication unit 412M outputs information representing a communication mode based on the information inputted from the switching control unit 414M.

The switching control unit 414M specifies, based on the information inputted from the communication module 420M, the communication mode to be used in communicating with the wireless communication device 400S. The control performed by the switching control unit 414M will be described later. In an another embodiment, the switching control unit 414M may be configured to output information representing a communication mode to the communication module 420M. In such a case, the control device 410M may be configured without including the PHY indication unit 412M.

The communication module 420M includes a communication circuit 421M, a PHY setting unit 422M, a disconnection detection unit 424M, a strength measurement unit 426M, and a channel detection unit 428M.

The PHY setting unit 422M sets a communication mode for use in communicating with the wireless communication device 400S based on the information inputted from the PHY indication unit 412M. The communication circuit 421M communicates with the wireless communication device 400S in the communication mode set by the PHY setting unit 422M. The communication circuit 421M includes a transmission circuit for transmitting information to the wireless communication device 400S and a reception circuit for receiving information from the wireless communication device 400S.

The disconnection detection unit 424M detects, by monitoring data signals outputted from the communication circuit 421M, whether or not the wireless communication conducted with the wireless communication device 400S has been disconnected. For example, when no signal is exchanged (when no communication is made) between the wireless communication devices 400M and 400S for a predetermined period of time (e.g., 4 seconds), the disconnection detection unit 424M determines that the wireless communication with the wireless communication device 400S has been disconnected. In the following, a communication disconnection detected in the above manner will also be referred to as a "supervision timeout." When the disconnection detection unit 424M detects a disconnection of wireless communication, the disconnection detection unit 424M reports the communication disconnection and the cause of the communication disconnection to the switching control unit 414M.

The strength measurement unit 426M measures the strength of signals (radio waves) received from the wireless communication device 400S and received by the communication circuit 421M. The strength measurement unit 426M functions as a so-called RSSI (Received Signal Strength Indication) circuit.

For example, the communication circuit 421M amplifies a received RF (radio frequency) signal, then down-converts the RF signal into an IF (intermediate frequency) signal of several hundred MHz. Furthermore, the communication circuit 421 removes noise from the down-converted signal using a filter and outputs the signal with noise removed to the strength measurement unit 426M. The strength measurement unit 426M amplifies the received signal using a limiter amplifier, subjects the amplified signal to full-wave rectification and outputs a voltage (RSSI signal) corresponding to the input signal. By subjecting the voltage to A/D conversion, the strength measurement unit 426M determines the strength (hereinafter also referred to as the "received signal strength indication") of the received signal (radio waves). The received signal strength indication is represented, for example, as a combination of voltage (V), power (W) and decibel (dB). The strength measurement unit 426M outputs the received signal strength indication thus determined to the switching control unit 414M.

The channel detection unit 428M performs CCA (Clear Channel Assessment) processing (determining unused frequency channels). Namely, the channel detection unit 428M detects unused channels out of the 40 channels set for BLE. For example, the channel detection unit 428M obtains the received signal strength indications for the respective channels from the strength measurement unit 426M and determines channels with received signal strength indications lower than a predetermined value as unused channels. The channel detection unit 428M reports whether or not each channel is unused to the switching control unit 414M. For example, the channel detection unit 428M outputs information as to whether or not each channel is unused to the switching control unit 414M every 625 μsec.

The storage unit 430M is composed of a non-volatile memory (e.g., a flash memory). The storage unit 430M stores a control program to be read and executed by the control device 410M.

In another embodiment, the strength measurement unit 426M or the channel detection unit 428 may be included in the control device 410M or in another configuration.

(Outline of Control)

Figure 5:
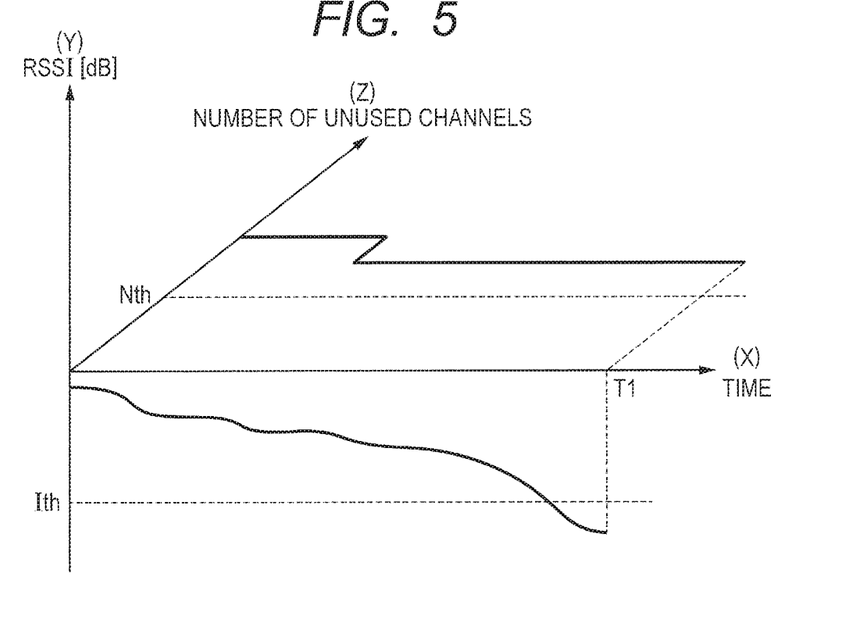
FIG. 5 is a diagram representing a communication disconnection caused by a long distance between wireless communication devices 400M and 400S.
Figure 6:
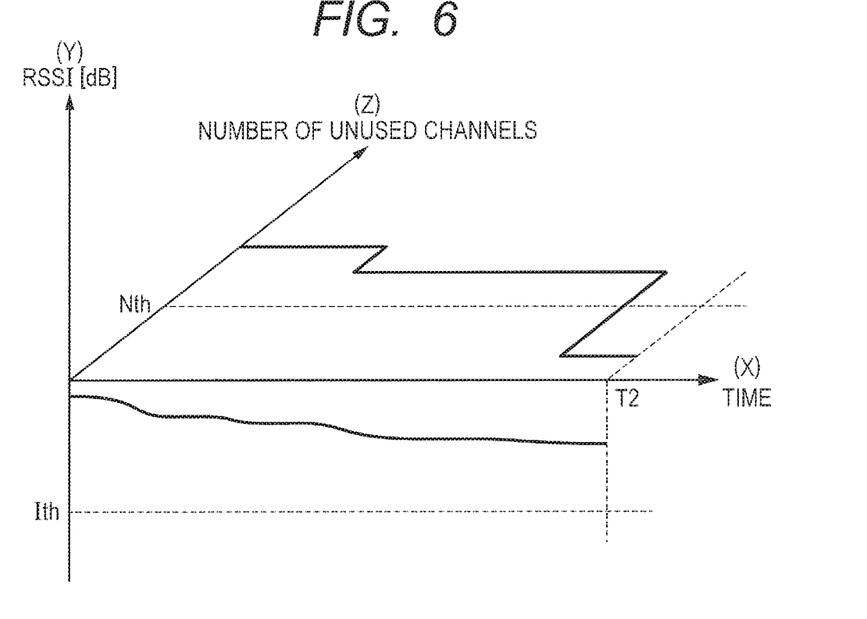
FIG. 6 is a diagram representing a communication disconnection caused by radio wave interference.

Next, with reference to FIGS. 5 and 6, communication mode switching control will be described. FIG. 5 is a diagram representing a communication disconnection caused by a long distance between the wireless communication devices 400M and 400S. FIG. 6 is a diagram representing a communication disconnection caused by radio wave interference. In FIGS. 5 and 6, the wireless communication devices 400M and 400S are assumed to be using the normal mode for communication.

In FIG. 5, the X axis represents time, the Y axis represents the received signal strength indication (RSSI) and the Z axis represents the number of unused channels detected by the channel detection unit 428M.

In a phase of communication, the disconnection detection unit 424M detects a communication disconnection at time T1 as a result of receiving no response from the wireless communication device 400S over a predetermined period of time (supervision timeout). At time T1, the received signal strength indication is lower than a predetermined strength Ith. Also, at time T1, the number of unused channels is larger than a predetermined number Nth (e.g., 10) of unused channels.

For example, the strength Ith is set to be a little lower than the strength of signals which the wireless communication device 400M receives, in an environment (concerning the degrees of radio-wave interference and obstacles) in which the wireless communication devices 400M and 400S are normally used, from the wireless communication device 400S separated by a maximum communication distance (theoretically 100 m) for the normal mode.

A received signal strength indication lower than the strength Ith means that the wireless communication devices 400M and 400S are far apart from each other. When the number of unused channels is equal to or larger than the number Nth, the communication between the wireless communication devices 400M and 400S is not much affected by radio wave interference. Hence, when a communication disconnection (supervision timeout) occurs as shown in FIG. 5, it is highly likely to have been caused by a long distance between the wireless communication devices 400M and 400S.

In such a case, the communication between the wireless communication devices 400M and 400S can be re-established by switching from the normal mode to a long-range mode in which the maximum communication distance is longer (code strength is higher) than in the normal mode.

Referring to FIG. 6, the disconnection detection unit 424M detects a communication disconnection (supervision timeout) at time T2. At time T2, the received signal strength indication is equal to or higher than the predetermined strength Ith. This indicates that the distance between the wireless communication devices 400M and 400S is short.

Also, at time T2, the number of unused channels is smaller than the predetermined number Nth (e.g., 10). This indicates that the communication between the radio communication devices 400M and 400S is much affected by radio interference.

Hence, when a communication disconnection (supervision timeout) occurs as shown in FIG. 6, it is highly likely to have been caused by ambient radio wave interference preventing packets sent out from the wireless communication device 400S from reaching the wireless communication device 400M.

In such a case, the communication between the wireless communication devices 400M and 400S can be re-established by switching from the normal mode to a long-range mode in which noise resistance is higher (code strength is higher) than in the normal mode.

(Switching Control for Switching from Normal Mode to Long-Range Mode—Master)

Figure 7:
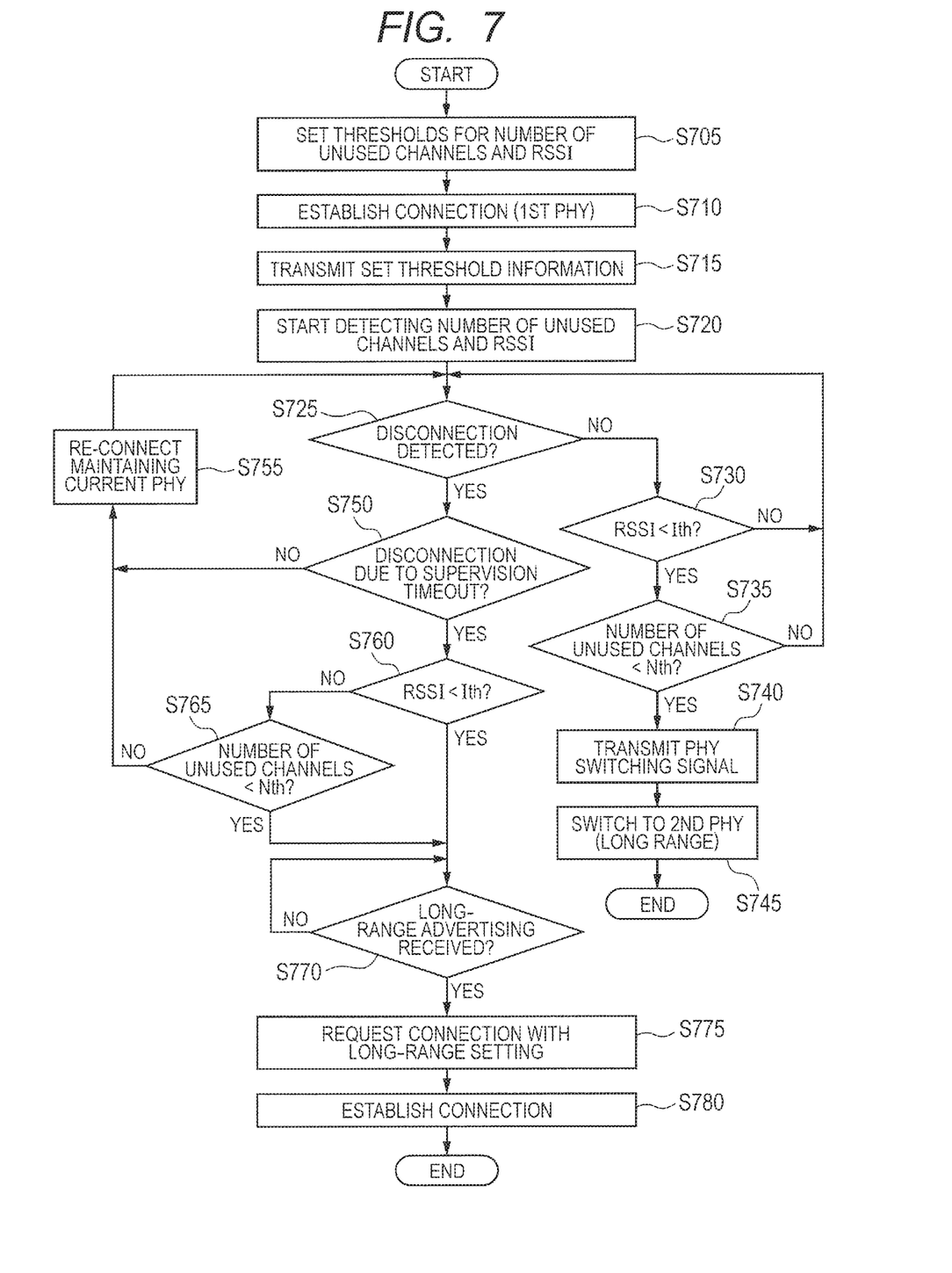
FIG. 7 is a flowchart of control made on the master side for switching from a normal mode to a long-range mode.
Figure 8:
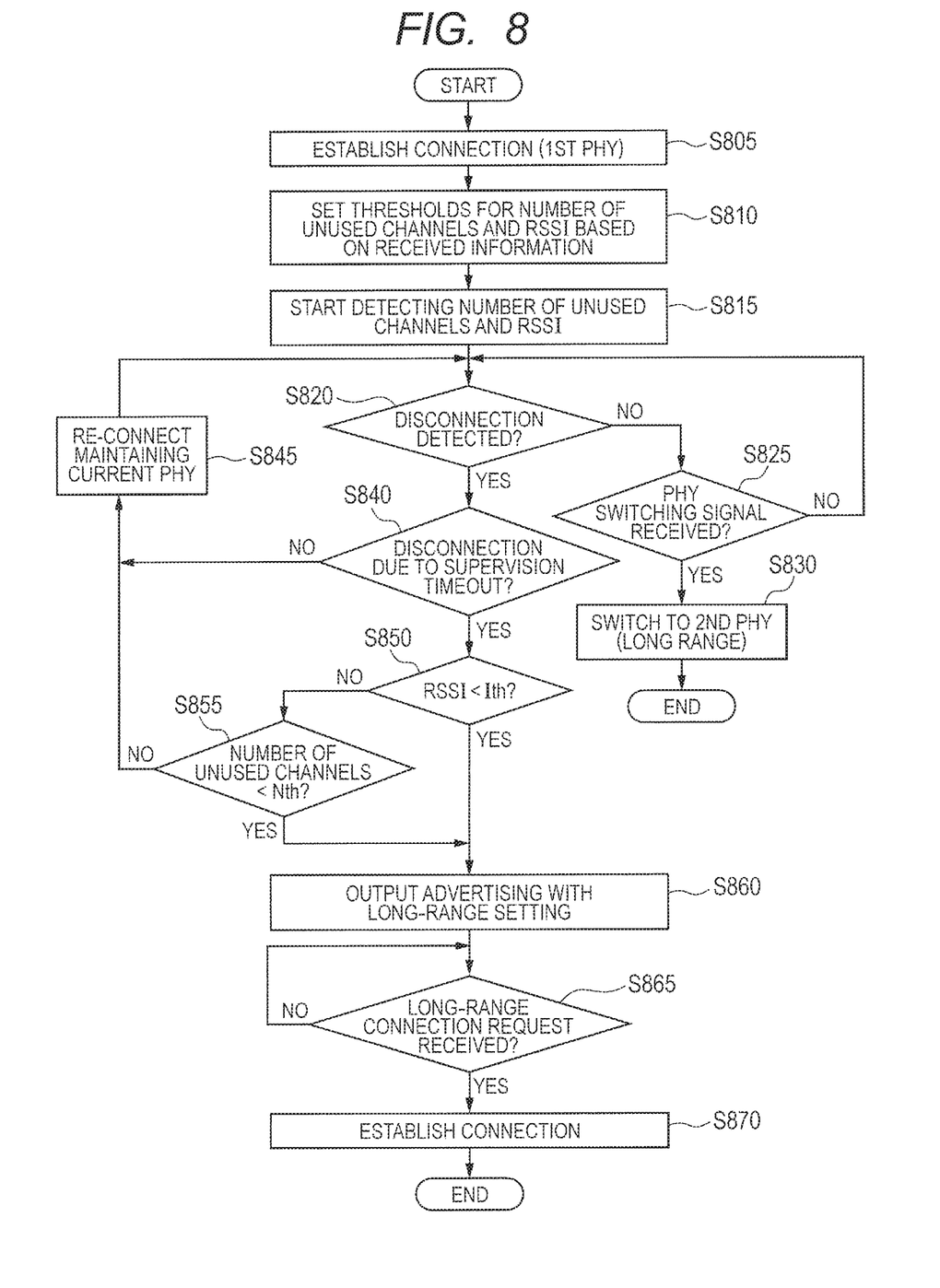
FIG. 8 is a flowchart of control made on the slave side for switching from the normal mode to a long-range mode.

FIG. 7 is a flowchart of control made on the master side for switching from the normal mode to a long-range mode. FIG. 8 is a flowchart of control made on the slave side for switching from the normal mode to a long-range mode. In the control examples shown in FIGS. 7 and 8, the wireless communication device 400M functions as a master and the wireless communication device 400S functions as a slave. The processing shown in FIG. 7 is realized as the control device 410M reads and executes a control program stored in the storage device 430M. The processing shown in FIG. 8 is realized as the control device 410S reads and executes a control program stored in the storage device 430S. The flowcharts shown in FIGS. 7 and 8 and the flowchart shown in FIG. 9, being described later, apply whether the long-range mode used is the first long-range mode or the second long-range mode.

Referring to FIG. 7, in step S705, the control device 410M sets a threshold Nth for the number of unused channels and a threshold Ith for the received signal strength indication (RSSI). To be specific, the control device 410M reads the thresholds from the storage device 430.

In step S710, the control device 410M establishes communication with the wireless communication device 400S. To be specific, when an advertising packet is received from the wireless communication device 400S, the control device 410M transmits a connection request to the wireless communication device 400S. At this time, the wireless communication devices 400M and 400S communicate with each other in the normal mode (the first PHY) based on default settings.

In step S715, the control device 410M transmits the threshold Nth for the number of unused channels and the threshold Ith for the received signal strength indication both set in step S705 to the wireless communication device 400S.

In step S720, the control device 410M monitors, as the switching control unit 414M, the strength measured by the strength measurement unit 426M of the signal received from the wireless communication device 400S (the received signal strength indication). The control device 410M also monitors the number of unused channels detected by the channel detection unit 428M out of the 40 channels used in BLE.

In step S725, the control device 410M determines whether or not the communication with the wireless communication device 400S has been disconnected. To be more specific, the control device 410M makes the above determination, as the switching control unit 414M, based on information inputted from the disconnection detection unit 424M. The disconnection detection unit 424M also detects, besides a supervision timeout, a communication disconnection caused by a low battery (not shown) charge.

When it is determined that the communication has been disconnected (step S725=YES), the control device 410M performs the processing of step S750; otherwise (step S725=NO), the control device 410M performs the processing of step S730.

<Switching Processing with Communication Established>

In step 30, the control device 410M determines, as the switching control unit 414M, whether or not the received signal strength indication detected by the strength measurement unit 426M is smaller than the threshold Ith. When it is determined that the received signal strength indication is smaller than the threshold Ith (step S730=YES), the control device 410M performs the processing of step S735; otherwise (step S730=NO), the control device 410M performs the processing of step S725 again.

In step S735, the control device 410M determines, as the switching control unit 414M, whether or not the number of unused channels detected by the channel detection unit 428M is smaller than the threshold Nth. When it is determined that the number of unused channels is smaller than the threshold Nth (step S735=YES), the control device 410M performs the processing of S740; otherwise (step S735=NO), the control device 410M performs the processing of S725 again.

In step S740, the control device 410M transmits, as the switching control unit 414M, an instruction (a PHY switching signal) for switching the communication mode from the normal mode (the first PHY) to a long-range mode (the second PHY) to the wireless communication device 400S. The PHY switching signal includes information representing the communication mode to be switched to.

In step S745, the control device 410M switches, as the switching control unit 414M, the communication mode from the normal mode to a long-range mode. For example, when an ACK signal responding to the PHY switching signal is received from the wireless communication device 400S, the switching control unit 414M outputs information representing a long-range mode to the PHY indication unit 412M. The PHY indication unit 412M outputs the information representing the long-range mode to the PHY setting unit 422M. Based on the information received from the PHY indication unit 412M, the PHY setting unit 422M sets the long-range mode for communication with the wireless communication device 400S.

The processing performed in step S730 through step S745 makes it possible, when it is determined that the communication maintained between the master (the wireless communication device 400M) and a slave (the wireless communication device 400S) is highly likely going to be disconnected, to switch the communication mode from the normal mode to a long-range mode. In this way, the wireless communication system 4 can reduce the possibility of the communication being disconnected. Moreover, since the wireless communication system 4 switches the communication mode while maintaining the communication, the communication mode can be switched smoothly.

In the example shown in FIG. 7, the wireless communication device 400M is configured to switch the communication mode when the received signal strength indication is smaller than the threshold Ith (step S730=YES) and the number of unused channels is smaller than the threshold Nth (step S735=YES). In a different situation, the wireless communication device 400M may be configured to switch the communication mode when either one of the above conditions is met. In such a case, the wireless communication system 4 can further enhance the communication reliability.

<Switching Processing with Communication Disconnected>

In step S750, the control device 410M determines whether or not the cause of the communication disconnection is a supervision timeout. When it is determined that the cause of the communication disconnection is a supervision timeout (step S750=YES), the control device 410M performs a sequence of processing steps for switching the communication mode.

A communication disconnection caused by a supervision timeout indicates that the supervision timeout occurred more likely as a result of one of the conditions described with reference to FIGS. 5 and 6 (long distance or significant radio wave interference) than as a result of a fault (e.g., turning off of a radio wave function or a low battery charge) on the wireless communication device 400S side. Hence, the wireless communication device 400M is configured to perform a sequence of processing steps for communication mode switching only when a communication disconnection is caused by a supervision timeout. In this way, the wireless communication system 4 can inhibit a communication slow-down due to unnecessary switching to a long-range mode.

In a different situation, the wireless communication device 400M may be configured not to perform the processing of step S750. In such a case, the wireless communication system 4 can further enhance the communication reliability.

When it is determined that the cause of the communication disconnection is not a supervision timeout (step S750=NO), the control device 410M tries re-establishing a connection with the wireless communication device 400S without changing the current communication mode (normal mode) (step S755). The control device 410M may be configured to end the sequence of processing steps for re-connection with the wireless communication device 400S when performing the re-connection processing a predetermined number of times or for a predetermined period of time cannot re-establish the communication with the wireless communication device 400S.

In step S760, the control device 410M determines, as the switching control unit 414M, whether or not the received signal strength indication detected by the strength measurement unit 426M is smaller than the threshold Ith. When it is determined that the received signal strength indication is smaller than the threshold Ith (step S760=YES), the control device 410M performs the processing of step S770; otherwise (step S760=NO), the control device 410M performs the processing of step S765.

In step S765, the control device 410M determines, as the switching control unit 414M, whether or not the number of unused channels detected by the channel detection unit 428M is smaller than the threshold Nth. When it is determined that the number of unused channels is smaller than the threshold Nth (step S765=YES), the control device 410M performs the processing of step S755; otherwise (step S765=NO), the control device 410M performs the processing of step S770.

In the example shown in FIG. 7, the wireless communication device 400M performs the processing for communication mode switching when either one of the conditions for the received signal strength indication (RSSI) (step S760) or for the number of unused channels (step S765) is met. For example, when the received signal strength indication is high enough but the number of unused channels is small, the control device 410M performs the processing for switching from the normal mode to a long-range mode. In this way, the wireless communication system 4 according to the present embodiment can further enhance the communication reliability.

In a different situation, the control device 410M may be configured to perform the processing for switching from the normal mode to a long range mode when both of the condition for the received signal strength indication (RSSI) and the condition for the number of unused channels are met. In this way, the wireless communication system 4 can inhibit a communication slow-down due to unnecessary switching to a long-range mode.

In step S770, the control device 410M switches the communication mode from the normal mode to a long-range mode and waits for an advertising packet complying with the long-range mode to be received from the wireless communication device 400S. In a different situation, the control device 410M may be configured to end the sequence of processing steps when no advertising packet is received from the wireless communication device 400S in a predetermined period of time.

In step S775, responding to an advertising packet received from the wireless communication device 400S, the control device 410M transmits a connection request complying with the long-range mode to the wireless communication device 400S. In this way, the wireless communication device 400M can establish communication with the wireless communication device 400S in the long-range mode (step S780).

Even when communication between the master (wireless communication device 400M) and the slave (wireless communication device 400S) is disconnected, the above processing of step S750 through step S780 makes it possible to have the communication automatically re-established by switching from the normal mode to the long-range mode.

The wireless communication device 400M performs the sequence of processing steps for communication mode switching only when it is determined that the disconnected communication can be highly likely re-established by performing the processing of steps S750, S760 and S765. In this way, the wireless communication system 4 can inhibit a communication slow-down due to unnecessary switching to a long-range mode.

(Switching Control for Switching from Normal Mode to Long-Range Mode—Slave)

Next, with reference to FIG. 8, the control configuration on the slave side corresponding to FIG. 7 will be described. In step S805, responding to a connection request received from the wireless communication device 400M, the control device 410S establishes communication (in the normal mode) with the wireless communication device 400M (corresponding to step S710).

In step S810, the control device 410S sets a threshold Nth for the number of unused channels and a threshold Ith for the received signal strength indication based on the information received from the wireless communication device 400M (corresponding to step S715).

The processing of steps S815, S820, S840 and S845 is the same as the processing of steps S720, S725, S750 and S755 shown in FIG. 7, so that the description will not be repeated here.

<Switching Processing with Communication Established>

In step S825, with the communication with the wireless communication device 400M established, the control device 410S determines whether or not a signal informing of a communication mode change (a PHY switching signal) has been received from the wireless communication device 400M.

When it is determined that a PHY switching signal has been received (step S825=YES), the control device 410S performs the processing of step S830; otherwise (step S825=NO), the control device 410S performs the processing of step S820 again.

In step S830, the control device 410S switches the communication mode from the normal mode to a long-range mode. For example, the switching control unit 414S outputs information representing a long-range mode to the PHY setting unit 422S. In response, the PHY setting unit 422S sets the long-range mode as the communication mode to be used in communicating with the wireless communication device 400M.

In the above example, the control device 410S is configured to switch the communication mode in accordance with an instruction from the wireless communication device 400M. In a different situation, the control device 410S may be configured to independently switch the communication mode by performing processing similar to the processing of steps S730 and S735.

<Switching Processing with Communication Disconnected>

In step S850, the control device 410S determines, as the switching control unit 414S, whether or not the received signal strength indication detected by the strength measurement unit 426S is smaller than the threshold Ith. When it is determined that the received signal strength indication is smaller than the threshold Ith (step S850=YES), the control device 410S performs the processing of step S860; otherwise (step S850=NO), the control device 410S performs the processing of step S855.

In step S855, the control device 410S determines, as the switching control unit 414S, whether or not the number of unused channels detected by the channel detection unit 428S is smaller than the threshold Nth. When it is determined that the number of unused channels is smaller than the threshold Nth (step S855=YES), the control device 410S performs the processing of step S860; otherwise (step S855=NO), the control device 410S performs the processing of step S845.

In step S860, the control device 410S switches the communication mode from the normal mode to a long-range mode and broadcasts an advertising packet.

In step S865, the control device 410S waits for a connection request complying with the long-range mode to be received from the wireless communication device 400S that has received the advertising packet. In a different situation, the control device 410S may be configured to end the sequence of processing steps when no connection request is received from the wireless communication device 400M for a predetermined period of time.

In step S870, with a connection request received from the wireless communication device 400M, the control device 410S can establish communication with the wireless communication device 400M in the long-range mode.

(Switching Control for Switching from Long-Range Mode to Normal Mode)

Figure 9:
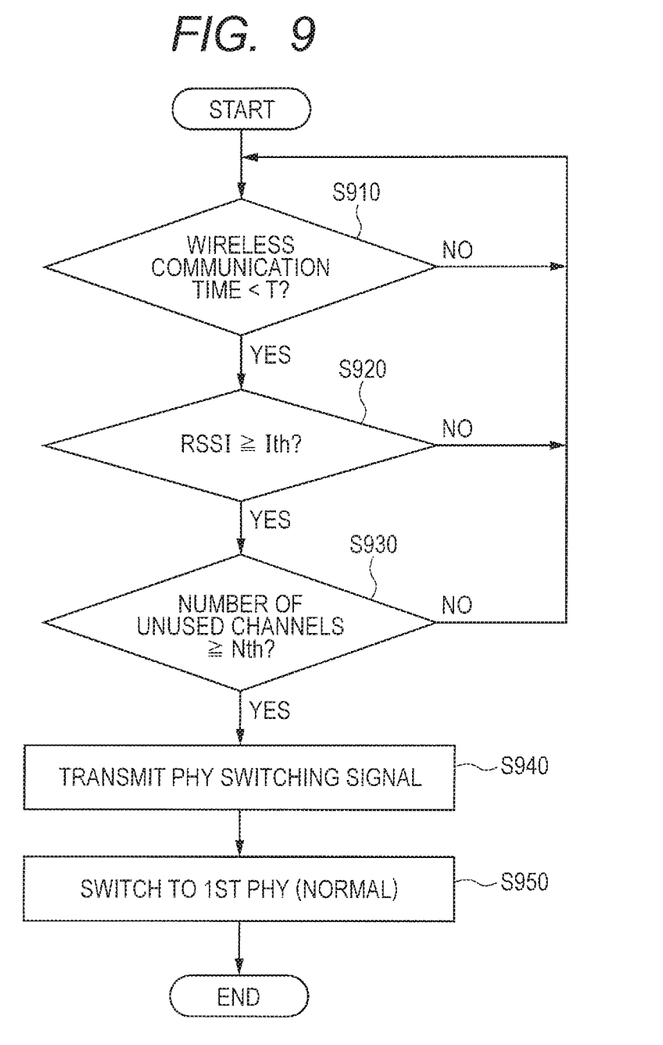
FIG. 9 is a flowchart of control made on the master side for switching from a long-range mode to the normal mode.

FIG. 9 is a flowchart of control made on the master side for switching from a long-range mode to the normal mode. In the example shown in FIG. 9, the wireless communication device 400M functions as a master and the wireless communication device 400S functions as a slave. The processing shown in FIG. 9 is realized as the control device 410M reads and executes a control program stored in the storage device 430M. Also, the processing shown in FIG. 9 is performed after step S745 or S780 shown in FIG. 7 (i.e., in a state with communication established in a long-range mode).

In step S910, the control device 410M determines, as the switching control unit 414M, whether or not the elapsed time with no communication (the time that has elapsed without any response from the wireless communication device 400S) is shorter than a predetermined time T. For example, the time T is set to correspond to the supervision timeout. When it is determined that the elapsed time with no communication is shorter than the time T (step S910=YES), the control device 410M performs the processing of step S920.

In step S920, the control device 410M determines, as the switching control unit 414M, whether or not the received signal strength indication (RSSI) is equal to or higher than the threshold Ith. When it is determined that the received signal strength indication is equal to or higher than the threshold Ith (step S920=YES), the control device 410M performs the processing of step S930; otherwise (step S920=NO), the control device 410M performs the processing of step S910 again.

In step S930, the control device 410M determines, as the switching control unit 414M, whether or not the number of unused channels is equal to or larger than the threshold Nth. When it is determined that the number of unused channels is equal to or larger than the threshold Nth (step S930=YES), the control device 410M performs the processing of step S940; otherwise (step S930=NO), the control device 410M performs the processing of step S910 again.

In step S940, the control device 410M transmits, as the switching control unit 414M, an instruction (a PHY switching signal) for switching the communication mode from the long-range mode (the second PHY) to the normal mode (the first PHY) to the wireless communication device 400S.

In step S950, the control device 410M switches, as the switching control unit 414M, the communication mode from the long-range mode to the normal mode. For example, when an ACK signal responding to the PHY switching signal is received from the wireless communication device 400S, the switching control unit 414M outputs information representing the normal mode to the PHY setting unit 422M. The PHY setting unit 422M then sets the normal mode as the communication mode to be used in communicating with the wireless communication device 400S.

When the PHY switching signal is received from the wireless communication device 400M functioning as a master in a state with communication established in the long-range mode, the wireless communication device 400S functioning as a slave switches the communication mode to the normal mode. This processing corresponds to the processing of steps S825 and S830 shown in FIG. 8.

In the way described above, the wireless communication system 4 according to the present embodiment switches the communication mode from a long-range mode to the normal mode when it is determined that communication in the normal mode is possible (steps S910, S920, S930=YES). Therefore, the wireless communication system 4 can inhibit a communication slow-down due to a long-range mode.

In the example shown in FIG. 9, the wireless communication device 400M (master) is configured to switch to the normal mode when both of the condition for the received signal strength indication and the condition for the number of unused-channels are met (steps S920 and S930=YES). In this way, the wireless communication system 4 can enhance the communication reliability.

In a different situation, the wireless communication device 400M may be configured to switch to the normal mode when either one of the above conditions is met. In this way, the wireless communication system 4 can further inhibit a communication slow-down due to a long-range mode.

[Other Configurations]

(Processing for Switching Between First Long-Range Mode and Second Long-Range Mode)

In the above embodiment, the wireless communication system 4 is configured to switch between the normal mode and a long-range mode. In other embodiments, the wireless communication system 4 may be configured to switch between the first long-range mode and the second long-range mode.

In a certain situation, the wireless communication system 4 switches from the normal mode to the first long-range mode when the received signal strength indication is lower than a threshold Ith1 while being equal to or higher than a threshold Ith2. Also, the wireless communication system 4 switches from the first long-range mode to the second long-range mode when the received signal strength indication is lower than the threshold Ith2.

In a different situation, the wireless communication system 4 switches from the normal mode to the first long-range mode when the number of unused channels is smaller than the threshold Nth1 while being equal to or larger than the threshold Nth2. Also, the wireless communication system 4 switches from the first long-range mode to the second long-range mode when the number of unused channels is smaller than the threshold Nth2.

In a still different situation, the wireless communication system 4 may be configured to switch the communication mode when both of the condition for the received signal strength indication and the condition for the number of unused channels are met. For example, the wireless communication system 4 switches from the first long-range mode to the second long-range mode when the received signal strength indication is smaller than the threshold Ith1 and the number of unused channels is smaller than the threshold Nth2. Also, the wireless communication system 4 switches from the first long-range mode to the second long-range mode when the received signal strength indication is smaller than the threshold Ith2 and the number of unused channels is smaller than the threshold Nth1.

In the way described above, the wireless communication system 4 can make it more possible to inhibit a communication slow-down while enhancing the communication reliability.

(Communication Standard)

In the above embodiment, the wireless communication system 4 is configured to communicate in compliance with the Bluetooth 5.0 wireless standard, but, in other embodiments, the wireless communication system 4 may be configured to communicate in compliance with another wireless standard. For example, the wireless communication system 4 can communicate in compliance with such wireless standards as ZigBee (registered trademark) and WiFi (Wireless Fidelity) (registered trademark).

It has been described that the above processing is realized by the control device 410M or 410S. The control devices 410M and 410S are each configured including at least one semiconductor integrated circuit such as a processor or at least one ASIC (Application Specific Integrated Circuit) or at least one DSP (Digital Signal Processor) or at least one FPGA (Field Programmable Gate Array) and/or another circuit having a calculation function.

The control devices can perform the above processing by reading one or more instructions from at least one physical medium (e.g., the storage device 430M or 430S).

The medium may be an optional type of memory such as a magnetic medium (e.g., a hard disk), an optical medium (e.g., a compact disc (CD) or a DVD), a volatile memory or a non-volatile memory, but is not limited to the above types of media.

The volatile memory may be a DRAM (Dynamic Random Access Memory) or an SRAM (Static Random Access Memory). The nonvolatile memory may be a ROM or an NVRAM. A semiconductor memory may make up, along with at least one processor, a part of a semiconductor circuit.

The invention made by the present inventors has been concretely described based on an embodiment, but the invention is not limited to the above embodiment and can be modified in various ways without departing from the scope of the invention. The above embodiment and modification examples may be appropriately combined.

What is claimed is:

1. A wireless communication device comprising:
   a communication circuit configured to communicate with another wireless communication device through a plurality of channels in a first mode with a first code strength and in a second mode with a second code strength higher than the first code strength; and
   a control device that:
      measures a strength of a signal received from the another wireless communication device;
      detects, out of the channels, unused channels and monitors a number of the detected unused channels based on a signal strength of each of the channels; and
      switches a communication mode of the communication circuit between the first mode and the second mode based on 1) the measured strength of the signal received from the another wireless communication device and 2) a comparison of the number of the detected unused channels to a predetermined number,
   wherein the control device switches the communication mode to the second mode from the first mode when, in a state with the communication mode set to the first mode, 1) the strength of the signal received from the another wireless communication device is lower than a predetermined strength and 2) the number of unused channels is smaller than the predetermined number.

2. The wireless communication device according to claim 1, wherein the control device switches the communication mode to the first mode when, in a state with the communication mode set to the second mode, the strength of the signal received from the another wireless communication device is equal to or higher than a predetermined strength while the number of unused channels is equal to or larger than the predetermined number.

3. The wireless communication device according to claim 1, wherein, responding to the switching of the communication mode, the communication circuit transmits a signal representing the switched to communication mode to the another wireless communication device.

4. The wireless communication device according to claim 1, wherein the control device switches the communication mode to the second mode when, in a state with the communication mode set to the first mode, communication with the another wireless communication device is disconnected due to a predetermined cause.

5. The wireless communication device according to claim 4, wherein, in a state with the communication with the another wireless communication device disconnected, when the communication mode is set to the second mode based on the strength of the signal received from the another wireless communication device and the number of unused channels, the communication circuit establishes communication with the another communication device by broadcasting a predetermined signal.

6. The wireless communication device according to claim 4, wherein the communication circuit is configured such that, in a state with communication with the another wireless communication device established, when the communication mode is set to the second mode based on the strength of the signal received from the another wireless communication device and the number of unused channels, the communication circuit transmits a connection request signal to the another wireless communication device as a response to reception of a predetermined signal complying with the second mode received from the another communication device.

7. A non-transitory tangible machine-readable medium storing one or more instructions, when executed by a computer included in a wireless communication device, cause the computer to control a communication mode of the wireless communication device,
    wherein the wireless communication device has a first communication mode for communication with a first code strength and a second communication mode for communication with a second code strength higher than the first code strength,
    wherein the wireless communication device is configured to communicate with another wireless communication device through a plurality of channels,
    wherein the instructions that cause the computer to execute the steps of:
        communicating with the another wireless communication device;
        measuring a strength of a signal received from the another wireless communication device;
        detecting, out of the channels, unused channels based on a signal strength of each of the channels,
        monitoring a number of the unused channels, and
        switching the communication mode of the wireless communication device between the first mode and the second mode based on 1) the measured signal strength and 2) a comparison of the number of unused channels detected out of the channels to a predetermined number, and
    wherein the communication mode is switched to the second mode from the first mode when, in a state with the communication mode set to the first mode, 1) the strength of the signal received from the another wireless communication device is lower than a predetermined strength and 2) the number of unused channels is smaller than the predetermined number.

\* \* \* \* \*